Sept. 15, 1970　　　　　　　　　O. O. FIET　　　　　　　　　3,529,238
PRESSURE GAUGE WITH DIAPHRAGM NULL POSITION MEANS
Filed Oct. 9, 1968　　　　　　　　　　　　　　　　4 Sheets-Sheet 1

Owen O. Fiet
INVENTOR.

BY *William B. Leach*

ATTORNEY

Sept. 15, 1970　　　　　O. O. FIET　　　　　3,529,238
PRESSURE GAUGE WITH DIAPHRAGM NULL POSITION MEANS
Filed Oct. 9, 1968　　　　　　　　　　　　4 Sheets-Sheet 2

Owen O. Fiet
INVENTOR.

BY William B Leach

ATTORNEY

Owen O. Feit
INVENTOR.

BY William B. Leach

ATTORNEY

United States Patent Office 3,529,238
Patented Sept. 15, 1970

3,529,238
PRESSURE GAUGE WITH DIAPHRAGM
NULL POSITION MEANS
Owen O. Fiet, Redondo Beach, Calif., assignor to TRW
Inc., Redondo Beach, Calif., a corporation of Ohio
Filed Oct. 9, 1968, Ser. No. 766,201
Int. Cl. G01r 27/26
U.S. Cl. 324—61                          12 Claims

ABSTRACT OF THE DISCLOSURE

A very sensitive diaphragm sensor is used in a closed loop electromechanical null seeking servosystem. Differential fluid pressure applied to the diaphragm is opposed by an equal electromagnetic diaphragm pressure produced by the interaction of diaphragm current and magnetic fields, the value of which provides a precise analog of the differential fluid pressure. A reference diaphragm, exposed on both faces to a reference pressure is used to electrically nullify error caused by external noise, external vibration, gas species, temperature and similar disturbances.

---

The electric servosystem disclosed herein is disclosed and claimed in copending application Ser. No. 766,261, filed concurrent herewith and assigned to the assignee of the present application.

BACKGROUND OF THE INVENTION

The field of art to which the invention pertains is fluid pressure sensing instruments of the type wherein an electrical quantity provides an identical point function analog of the measured pressure.

Present electromechanical pressure transducers and systems have inherent error and therefore have limited usefulness in high precision applications. Transducer and system errors occur when operated in an open loop electrical circuit. Such circuits provide pressure measurements which are dependent upon the elastic properties of the transducer.

Error may also be introduced by extraneous sources of vibration and noise, by changes in the fluid species, by sorption or permeation, and by temperature changes. A high precision pressure transducer must be insensitive to such factors or include means for cancelling the effects thereof.

A highly precise pressure sensing instrument may be utilized as a calibration unit or a relative standard for other instruments and systems. Such an instrument should be capable of making a precise substitution of an electrical quantity for the fluid pressure and be directly traceable to standards established by the United States National Bureau of Standards. In other words, the measurement should be directly traceable to mass, force, length or time.

It is accordingly an object of the present invention to measure with high precision the applied fluid pressure to a diaphragm of a pressure sensing instrument.

Another object of the present invention is to provide a precision instrument capable of substituting an electromagnetic force as an analog of fluid pressure.

A further object of the present invention is to provide a pressure sensing instrument compensated to eliminate errors from extraneous factors.

Yet another object of the present invention is to provide a precision pressure measuring instrument which provides a measurement which is directly traceable to standards set by the National Bureau of Standards.

Yet another object of the present invention is to provide a precision pressure sensing instrument having a sensitivity in the order of $10^{-12}$ mm. Hg (millimeters of mercury).

SUMMARY OF THE INVENTION

A precision pressure measuring instrument in accordance with the present invention permits measurement of differential pressures on a thin electrical conductor diaphragm by substituting an equal and opposing electromagnetic force for the fluid pressure. The instrument includes an electrical conducting rectangular diaphragm having current distributing means along two opposing edges. The distributing means serves to distribute a current of uniform density in the diaphragm. Mounting blocks having circular apertures are contiguous the surfaces of the diaphragm.

In addition thereto, the diaphragm is subjected to a tangential magnetic field transverse to the direction of current conduction. The interaction of the magnetic field and the current is a uniform electromagnetic force normal to the plane of the magnetic field and current, i.e., normal to the diaphragm. When the electro magnetic force is equal and opposite to the applied fluid pressure, diaphragm deflection stresses are eliminated and the electromagnetic force is a measure of the fluid pressure.

A servosystem is also provided for determining the deviation of the diaphragm from a null position and for adjusting the electromagnetic force upon the diaphragm to return the diaphragm to the null posiiton.

DESCRIPTION OF THE PREFERRED EMBODIMENT

Figure 1:
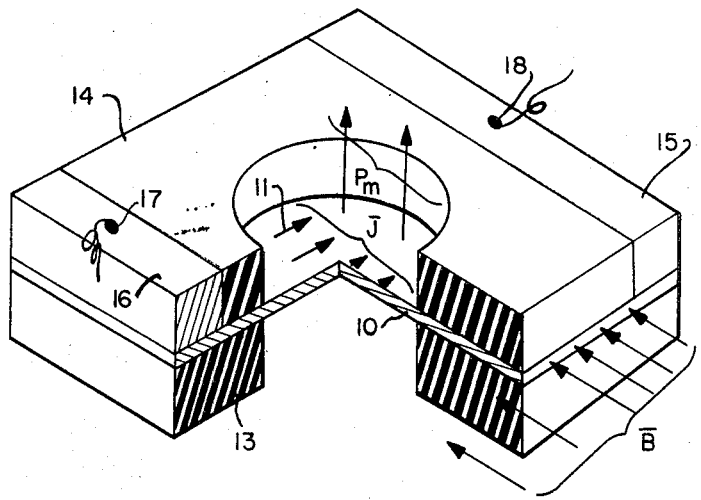
FIG. 1 is a perspective view in partial section of the elementary pressure sensing portion of an instrument in accordance with the present invention.

Referring to the drawings, wherein like elements are designated by like reference characters in the several views, there is illustrated a force balancing type instrument for measuring a differential fluid pressure. The fluid to be measured may be a gas or liquid. The reference pressure medium may be a like or differing fluid.

The differential fluid pressure is applied to a displaceable force sensing member, e.g., to opposing faces of a diaphragm. Deviations of the diaphragm from a null position are sensed. An electromechanical servosystem controls an electromagnetic force acting upon the diaphragm so as to return the diaphragm to its null position. The electromagnetic force is therefore an exact point function analog of the differential pressure.

In FIG. 1 there is shown a diaphragm assembly. Since a static fluid pressure is exerted normal to and uniformly over a solid boundary, it follows that the electromagnetic force, to be an exact replica of the fluid force, must also be normal to and uniformly distributed over the sensing diaphragm. To this end, diaphragm 10 is clamped between a lower mounting block 13 and an upper mounting block 14. Blocks 13, 14 have aligned apertures which expose a central circular portion of diaphgram 10. This central portion or unclamped portion 11 of diaphragm 10 serves as the active or sensing portion. The differential fluid pressure is directed to the opposing unclamped portions 11 of diaphragm 10.

Mounting blocks 13, 14 are of insulating material. As is clear in FIG. 1, block 14 is somewhat narrower than block 13. This accommodates the placement of end bars 15, 16 along opposing edge portions of diaphragm 10. End bars 15, 16 are of current conducting material.

As has been stated, the static fluid pressure exerted upon the unclamped portion 11 of diaphragm 10 will be a force normal to portion 11 and uniformly distributed thereover. An identical opposing uniform electromagnetic force may be created on unclamped portion 11. The conditions required for uniform normal electromagnetic pressure $P_M$ are a uniform current density $\overline{J}$ and constant and uniform transverse tangential magnetic flux $\overline{B}$ at the unclamped surfaces 11 of diaphragm 10.

Uniform current density $\overline{J}$ is readily attained by attaching full width conducting bars 15, 16 on the rectangular diaphragm. A current of uniform density will be conducted by diaphragm 10 provided diaphragm 10 is rectangular, and has uniform electrical conductivity, thickness and width. A uniform transverse tangential magnetic field may be readily supplied by a properly designed permanent magnet or electromagnet.

When the magnetic field $\overline{B}$ is contant, the electromagnetic force is directly proportional to the current through the diaphragm and is an effective means for controlling the displacement of the diaphragm. If a differential pressure displaces the diaphragm from its null position, a servosystem may be used to direct a larger current in the diaphragm, thus more electromagnetic pressure is created and the diaphragm is returned to the null position. The current is therefore an exact measure of the differential pressure.

Figure 2:
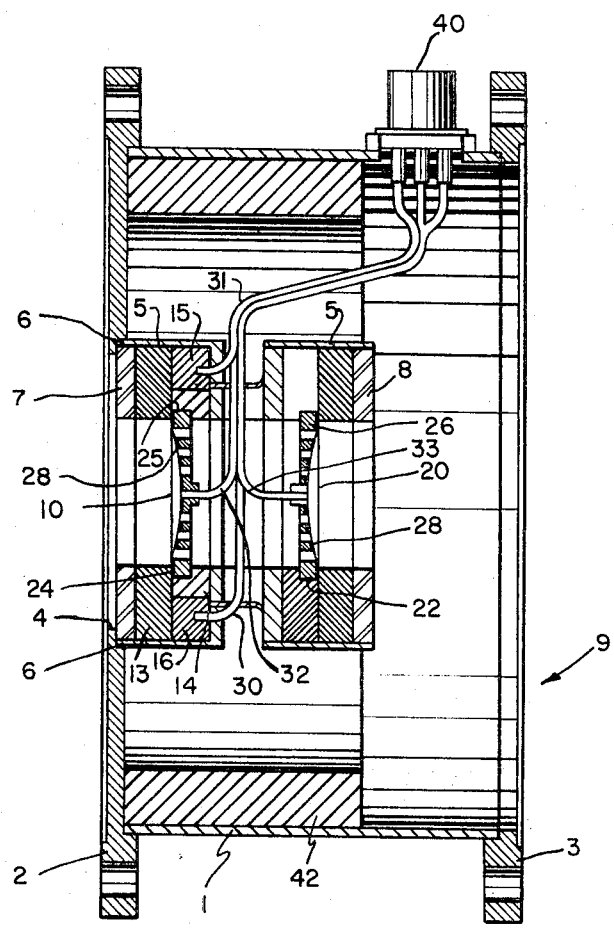
FIG. 2 is an elevational view in cross section of the pressure sensing apparatus of FIG. 1 in association with an instrument housing.
Figure 3:
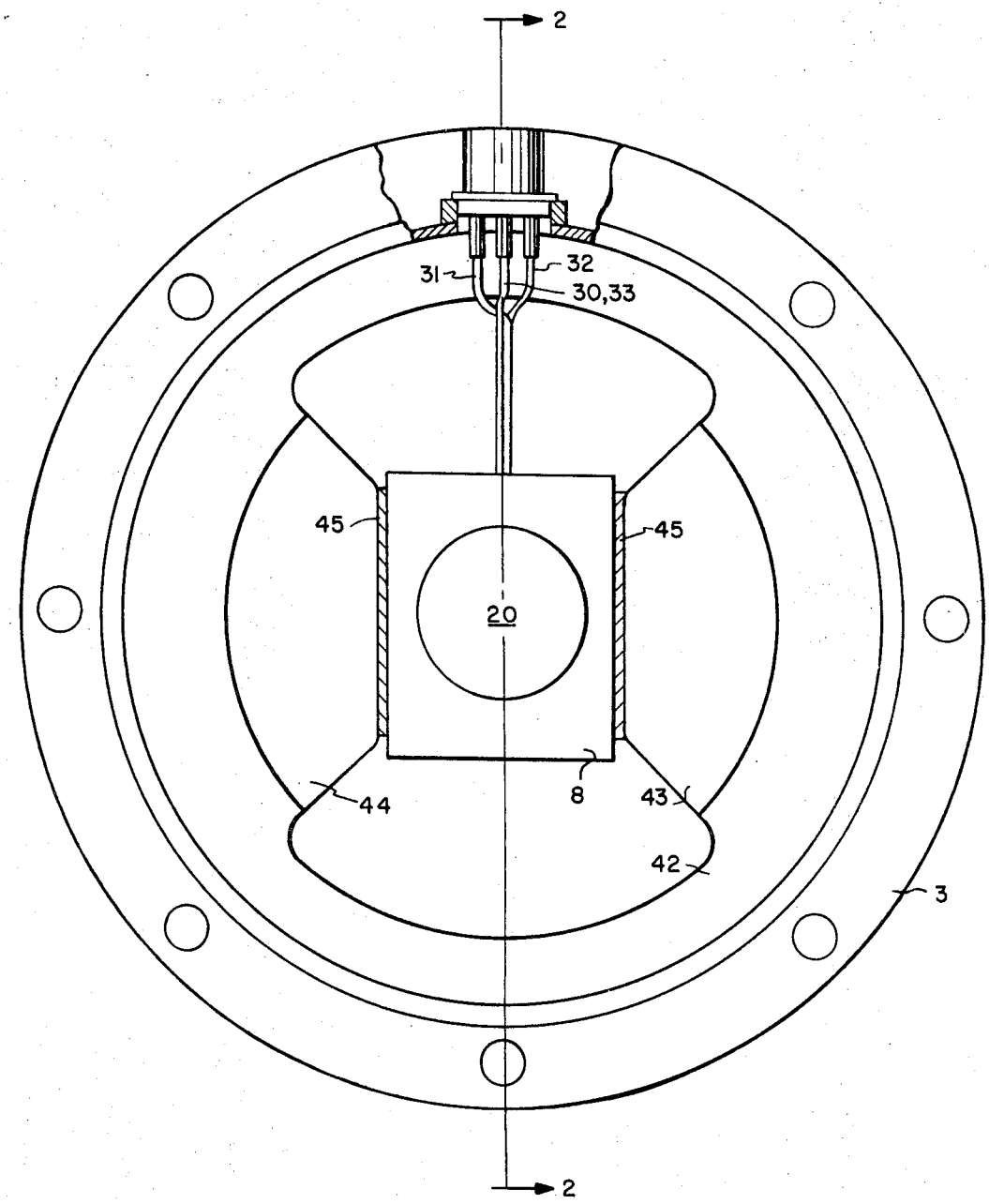
FIG. 3 is an end view of the pressure sensing instrument of FIG. 2.

Turning now to FIGS. 2 and 3, there is shown a precision pressure sensing instrument, generally designated, incorporating the diaphragm assembly of FIG. 1. A second diaphragm or reference diaphragm 20 is included to obtain direct electrical compensation for errors due to the effect of factors such as vibration, change in gas species, sorption, permeation and temperature. Capacitance electrodes 22, 24 are provided to ascertain deviations of the diaphragms from a null position. The electrical capacity of pressure diaphragm 10 is compared to the electrical capacity of reference diaphragm 20. The capacity differential is proportional to the applied differential fluid pressure. Any deviation of the diaphragm common to each are effectively cancelled.

The capacity differential is produced as an electrical output of a bridge circuit. This output is amplified and the output, being proportional to the fluid pressure differential, is used for negative feedback to control the pressure diaphragm current. The diaphragm is thus restored to its null position.

As has been stated, the electrodes 24, 26 each cooperate with diaphragms 10, 20, respectively, to measure the capacitive differential of the two diaphragms. As explained above, these elements form a portion of an AC bridge circuit. It is appreciated that other types of position sensors may be used. In order to maintain the precision characteristics of the instrument, the position sensor must not create friction, must have minimal force loading on the diaphragm, and be independent of the pressure being sensed. For example, an inductance sensor is very usable for the reason that it does not create any strong electrical forces on the diaphragm. Similarly, a mirrored surface on the pressure sensing diaphragm enables the use of photo optics techniques. Also, an optical flat placed on or near the surface of the sensor diaphragm lends to interferometric measurements. Extremely precise measurements may thus be made. Variations of the diaphragm within a half wave length of light may be sensed. Interferometry, however, requires highly precise diaphragm surfaces.

As shown in FIGS. 2 and 3, the instrument includes a cylindrical housing 1, having flanges 2 and 3. Flange 2 extends inwardly over the housing 1 to form a circular aperture 4 through which the fluid whose pressure is to be measured is admitted. Frame member 5 is provided for holding two diaphragm assemblies as shown in FIG. 1. Frame member 5 is fixed to flange 2 as at 6, which may be a welded joint. Retainer plates 7 and 8 serve to hold the diaphragm assemblies within frame member 5.

The pressure sensing diaphragm assembly is similar to that of FIG. 1. As shown in FIG. 2, diaphragm 10 is clamped between a lower mounting block 13 and an upper mounting block 14. Electrically conducting end bars 15, 16 serve to distribute current to diaphragm 10.

A pressure electrode 24 is mounted on shoulder 25 of upper mounting block 14. A reference electrode 26 of similar construction is provided adjacent reference diaphragm 20. Each electrode 24, 26 further serves as a stop plate or seat to restrain its associated diaphragm from excessive deflection. The surface of the electrode facing its associated diaphragm is shaped to coincide with the normal elastic curve of the diaphragm at a desired limit of deflection. In order to eliminate mechanical clamping and electrode shorting, a low friction insulating coating 28, such as polytetrafluoroethylene, is applied to the face of each electrode 24, 26.

Electrical conductors 30, 31 for diaphragm current and electrode conductors 32, 33 are terminated in a standard pressure tight electrical connector 40 for ready connection to the external electromechanical servosystem circuitry. The pressure to be measured is admitted through aperture 4 in housing flange 2 and to one surface a diaphragm 10 through the apertures in retainer plate 7 and lower mounting block 13. Reference fluid is admitted to the housing interior where it acts upon both surfaces of the reference diaphragm 20 and upon the other face of pressure diaphragm 10.

Other features of the precision pressure sensing instrument include a cylindrical yoke magnet 42. Magnet 42 has integrally formed inwardly facing poles 43, 44 which direct magnetic lines of flux tangentially across the diaphragms 10, 20. The pole faces are positioned closely adjacent the edges of diaphragms 10, 20 to insure a strong magnetic field. The faces are electrically insulated from diaphragms 10, 20 by a thin coating of high temperature insulation varnish 45.

The operation of the pressure sensing instrument will now be explained with reference to the electric servosystem shown in FIG. 4.

The pressure sensing instrument 9 is shown within the dashed lines. One face of pressure diaphragm 10 is exposed to the fluid whose pressure is to be measured. The other face of diaphragm 10 and each face of diaphragm 20 are exposed to a reference pressure. A control current may be directed through diaphragm 10 via conductors 30 and 31. Pressure electrode 24 capacitively cooperates with diaphragm 10 to determine the position of diaphragm 10. Reference electrode 26 cooperates with diaphragm 20 to determine its position. Since both diaphragms will be subject to common disturbances not originating from a fluid pressure change, all such external disturbances will be electrically cancelled. The capacitive differential of the two diaphragms is used as an electrical output of a capacitive measuring AC (alternating current) bridge circuit. The bridge in conjunction with the diaphragm and electrodes of the gauge serves to detect the position of the gauge diaphragm or force sensing member. The bridge circuit includes the electrodes 24, 26, inductive coils $L_1$ and $L_2$, and transformer coil $L_0$.

The output of the bridge circuit is a first signal which is representative of the instantaneous condition of the force sensing member in the gauge. The output of the bridge circuit is coupled to the input of a narrow band filter 55. This filter aids in decreasing the system noise power as reflected by the formula $P_n \simeq A \Delta f$. It will be appreciated that a narrow band of frequencies will tend to minimize the total noise power. If the system noise is minimal, a very small signal may be measured or otherwise detected and used. Furthermore, if the magnitude of the signal to be used by the servosystem is very small, then the deflection of the gauge diaphragm required to produce that signal is correspondingly small. A small deflection lends tself to a better response time and less diaphragm fatigue. The output of filter 56 is coupled to the input of AC amplifier 50. The gain of amplifier 50 is preferably very high, such as one million. The amplifier gain is then effectively the limit upon the system resolution. The control signal used to produce a restoring force current in the diaphragm is therefore very large for a very small diaphragm deflection. Thus, the diaphragm may be continually maintained very near its null position. Since there must always be some diaphragm deflection to produce the first signal or bridge output there is inherently an error between the indicated pressure as electrically indicated and the actual fluid pressure. However, with a gain of one million, there is only an error of one part in a million.

The amplifier output is coupled to the input of detector 51. Detector 51 operates upon the first signal to produce two DC (direct current) output voltages. One output 57 is directly proportional to the amplitude of the amplified AC bridge output signal. This voltage is used to vary the current to the gauge diaphragm. A generator current source 54 is coupled to the gauge diaphragm and is variable in magnitude by changes in the bridge output as described above. The other detector output 58 is coupled to oscillator 49. Oscillator 49 impresses an AC wave upon the bridge circuit. Output 58 is representative of the phase difference between the oscillator output 59 and the amplified bridge output. In this manner, the oscillator frequency may be varied to produce a bridge output signal at a frequency which will be most efficiently transmitted by filter 56. Thus, a phase-lock loop is provided. This assures operation of the oscillator at the frequency where the amplifier gain and signal to noise ratio are maximum.

A DC power amplifier 52 is provided for the purpose of matching the power level of the first signal or pressure error signal to auxiliary equipment such as visual display devices or chart recorders 53.

The restoring pressure is applied to pressure diaphragm 10 by DC current from power supply 54 which is in turn controlled by an amplified output from error amplifier 52. A decade type unit 55 is useful as a means for setting a zero output reading when there is no applied fluid pressure. It is also useful as a means for applying a constant current to pressure diaphragm 10. In this manner, the current producing the electromagnetic diaphragm pressure may be displayed on a digital or analog device minus a fixed pressure. Thus, deviations in pressure about a nominal operating pressure other than zero may be sensed with high accuracy.

Figure 4:
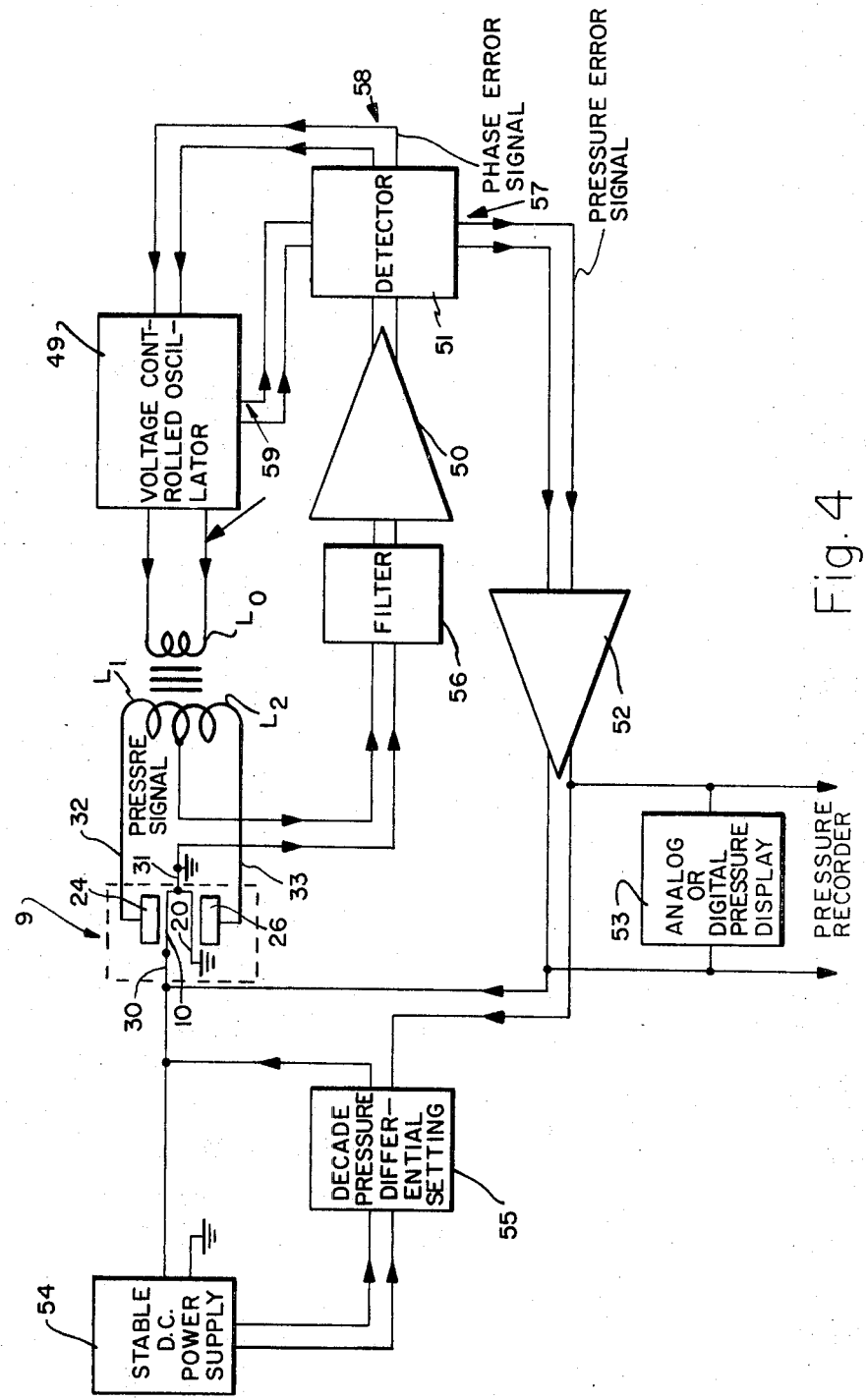
FIG. 4 is a schematic of a servosystem circuit in which the instrument of FIGS. 2 and 3 may be used.

It is noted that while a pressure diaphragm DC current supply 54 is shown in FIG. 4, an AC current may be used to control the diaphragm magnetic pressure. In the latter case, the magnetic field must be generated by an AC electromagnet from the same power supply. In this manner, the direction of current and magnetic flux reverse simultaneously and the resultant force on the diaphragm remains unidirectional. However, the AC field frequencies must be above the mechanical resonant frequency of the pressure diaphragm in order to avoid induced vibration.

The differential pressure sensing instrument as has been described is particularly useful when the fluid pressure is very low or near vacuum. The aperture 4 in housing flange 2 may be as large as or larger than the working or unclamped portion 11 of diaphragm 10. Existing diaphragm type differential pressure meters do not provide an open exposure of the diaphragm. The larger aperture 4 provides for a relative high molecular conductance, therefore, maximum response speed. Flange 2 may be mounted directly in or on the wall of a pressure chamber.

The gauge of the type described may also be used for the measurement of pressure exceeding one atmosphere. A very thin diaphragm is desirable for small applied differential pressures, but may not be able to carry sufficient current per unit width to accommodate an adequate restoring force. For large differential pressure, a thicker diaphragm may be used.

The large aperture 4 provides the further advantage of direct measurement of diaphragm deflection. Supplementary measurements may be made by optical means, infrared, or microwave interferometers.

The materials used in constructing an instrument as discussed herein may be selected to meet the conditions of the particular working fluids, such as corrosiveness. The pertinent equations for a typical instrument will now be considered.

The magnetic force density at a point in a solid current conductor is given by $F_m = \overline{J} \times \overline{B}$ where $F_m$ is in Newtons/cubic meter; $\overline{J}$ is the current density in amperes/square meter; and $\overline{B}$ is the magnetic flux density in Webers/square meter. Where there is only an $x$ component of current and a $y$ component of magnetic flux, there is only a $z$ component of force. The magnetic pressure $P_m$ per unit area of diaphragm may be obtained by integration. Where $\overline{J} \times \overline{B}$, the diaphragm thickness $t$, length $l$, and width $w$ are constant, the magnetic pressure $P_m$ is constant and equal to $\overline{J} t \times \overline{B}$.

Considering a current conducting diaphragm of .001 inch thick high magnetic permeativity, a 2.0 inch diameter unclamped surface area, a saturation inductance of 23,000 Gauss, $26 \times 10^{-6}$ ohm centimeter resistivity, 90,000 pounds/square inch ultimate strength, 55,000 p.s.i. yield strength, $35 \times 10^6$ p.s.i. modulus of elasticity, a relative permeability of $10^5$ at 19,000 Gauss, and $\overline{B}$ equal to 2 Webers/square meter, the current requirements for magnetic restoring of the diaphragm to the null position may be determined. An applied fluid differential pressure of one atmosphere is $1.02 \times 10^5$ Newtons/square meter, thus $P_m$ must be equivalent thereto. Hence, $$\overline{J}t = P_m/\overline{B} = 1.02 \times 10^5/2.0 = 5.1 \times 10^4$$

amperes/meter / atmosphere $= 1.29 \times 10^3$ amperes / inch width/atmosphere $= 1.708$ amperes/inch width/millimeter of mercury. The restoring current may be readily supplied for practical diaphragm widths.

An analysis of Joule heating effects for the foregoing current diaphragm yields 14.9 milliwatts/square inch of Joule heating which can be readily dissipated by radiation and conduction without excessive temperature rise.

Figure 5:
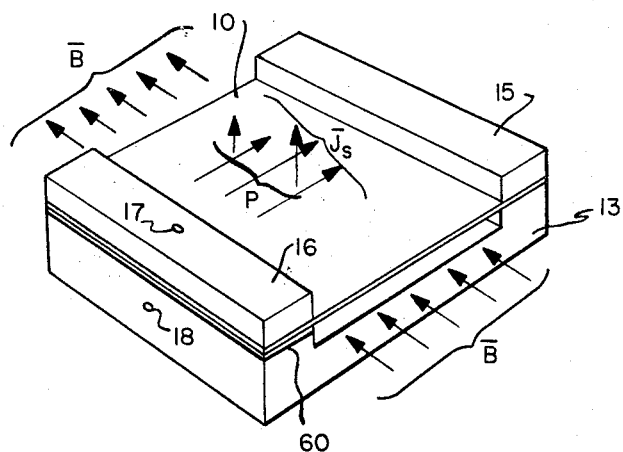
FIG. 5 is an alternative arrangement of the pressure sensing portion of the instrument.

An alternative embodiment of a diaphragm assembly is shown in FIG. 5. Again, diaphragm 10 is clamped along opposing edge portions. Lower clamping block 13 is generally U-shaped and is of current conducting material. Clamping of diaphragm is completed by conducting bar 15, 16. Diaphragm 10 and lower block 13 are separated by an insulating sheet 60. Current connections are made at 17 and 18. Current flows from 17 into bar 16, through diaphragm 10, through lower block 13, and the circuit is completed externally through connection 18. The current flowing through diaphragm 10 induces a magnetic field thereabout which interacts and reinforces a magnetic field induced about block 13. Current in diaphragm 10 therefore cuts transversely through the induced magnetic field. A resultant force is imposed on diaphragm 10. This is the same force found in a motor or generator.

The force on the diaphragm is normal thereto and constant in portions within the diaphragm that are removed from the edges of the diaphragm. The outer portions of the diaphragm may be clamped similar to the assembly of FIG. 1. Without the large external magnetic field, the control pressure will be proportional to the square of the control current. The control sensitivity will therefore be less than the embodiment of FIG. 1.

A differential pressure sensing instrument and electric servosystem as disclosed herein will have the ability to measure pressure in the magnitude of $10^{-10}$ to $10^{-12}$ millimeters of mercury. Extraneous effects of external noise, external vibration, change in gas species, sorption, permeation and temperature are automatically cancelled. There is relatively high attenuation and damping of extraneous vibration by the magnetic field and by the negative feed back. There is direct access to the sensing diaphragm enabling direct diaphragm deflection measurements. The direct access also provides high vacuum conductance for maximum response when working at vacuum pressures. And, finally, the instrument is capable of direct pressure calibration from current.

We claim:

1. A differential pressure sensing instrument comprising:
   (a) an electrically conducting rectangular diaphragm;
   (b) clamping means associated with said diaphragm for rigidly clamping said diaphragm along opposing portions thereof;
   (c) means communicating with the opposing unclamped surfaces of said diaphragm for admitting differential fluid pressure onto said surfaces;
   (d) current distributing means associated with said diaphragm for distributing current of uniform density in the unclamped portion of said diaphragm;
   (e) magnetic field means associated with said diaphragm for subjecting said diaphragm to a uniform magnetic field tangential to said diaphragm and transverse to the diaphragm current in a direction which directs the resultant electromagnetic force in opposition to the fluid pressure, whereby the electromagnetic reaction force of the current and magnetic field is normal to said diaphragm and may be made to equally oppose the differential fluid pressure and the current and magnetic field magnitudes provide an analog of the differential fluid pressure.

2. The instrument of claim 1 wherein said magnetic field means includes:
   (a) a rigid electrically conducting plate in spaced facing parallel relationship to said diaphragm; and
   (b) a current path connecting said plate and said diaphragm, said plate and said diaphragm being closely spaced as to accommodate the interaction of the induced magnetic fields associated with the current flow in said plate and said diaphragm, whereby the diaphragm current reacts with the induced magnetic fields to produce the resultant force on said diaphragm.

3. The instrument of claim 1 wherein said magnetic field means includes north and south magnetic poles positioned adjacent opposing marginal portions of said diaphragm and arranged to subject said diaphragm to a tangential magnetic field of uniform density.

4. The instrument of claim 3 wherein direct current supplied by said current means reacts with said magnetic field means to produce a force on said diaphragm which opposes the influence of the fluid pressure.

5. The instrument of claim 3 wherein the current is alternating current having a frequency sufficiently high so as to exceed the resonant frequency of said diaphragm.

6. The instrument of claim 3 wherein the magnetic field intensity is constant whereby the magnitude of the diaphragm current required to create a resultant force equal to the differential fluid pressure is the analog of the differential fluid pressure.

7. The instrument of claim 6 wherein the magnetic field intensity is at least ten times the intensity of the magnetic field induced by the current flowing in said diaphragm.

8. The instrument of claim 1 further comprising:
   position sensing means for measuring the movement of said diaphragm from a null position whereby there is determined a measure of the differential fluid pressure applied to said diaphragm.

9. The instrument of claim 8 wherein said position sensing means includes an electrode supportably mounted on said clamping means and arranged to capacitively cooperate with said diaphragm.

10. A compensated differential pressure sensing instrument comprising:
    (a) first and second electrically conducting rectangular diaphragms, each rigidly clamped at opposing portions thereof, said diaphragms being in facing parallel relationship one to another;
    (b) means communicating with the facing unclamped surfaces of said diaphragms and with the nonfacing unclamped surface of said second diaphragm for admitting a reference fluid pressure to said surfaces;
    (c) means communicating with the nonfacing surface of said first diaphragm for admitting a fluid whose pressure is to be determined;
    (d) current distributing means associated with said first diaphragm for distributing a current of uniform density therein;
    (e) magnetic field means associated with each of said diaphragms for subjecting said diaphragms to a uniform magnetic field tangential to each said diaphragm and transverse to the flow of current in said first diaphragm; and
    (f) position sensing means associated with said diaphragms for determining the deviation of said diaphragms from a nominal position, whereby the reaction of the current and the magnetic field is a force on and normal to said first diaphragm which may be made to equally oppose the differential fluid pressure, and whereby nonfluid pressure caused deviations common to each of said diaphragms may be electrically cancelled.

11. The instrument of claim 10 wherein said magnetic field means includes a cylindrical yoke permanent magnet having radially inwardly facing north and south poles and arranged to direct the magnetic flux between said poles tangentially to said diaphragms.

12. The instrument of claim 10 wherein said position sensing means includes a pair of electrodes, each arranged to capacitively cooperate with one of said diaphragms, whereby deviations of said diaphragms from a normal position varies the capacitance to indicate the deviation thereof.

References Cited

UNITED STATES PATENTS

| | | | |
|---|---|---|---|
| 2,753,515 | 7/1956 | Rickner | 317—246 XR |
| 3,356,917 | 12/1967 | Goldstein | 317—246 XR |

A. E. SMITH, Primary Examiner

U.S. Cl. X.R.

73—398; 317—246, 255; 324—34